Feb. 20, 1968     A. E. PETERS     3,369,450
MICROFICHE VIEWER
Filed Sept. 10, 1965     4 Sheets-Sheet 1
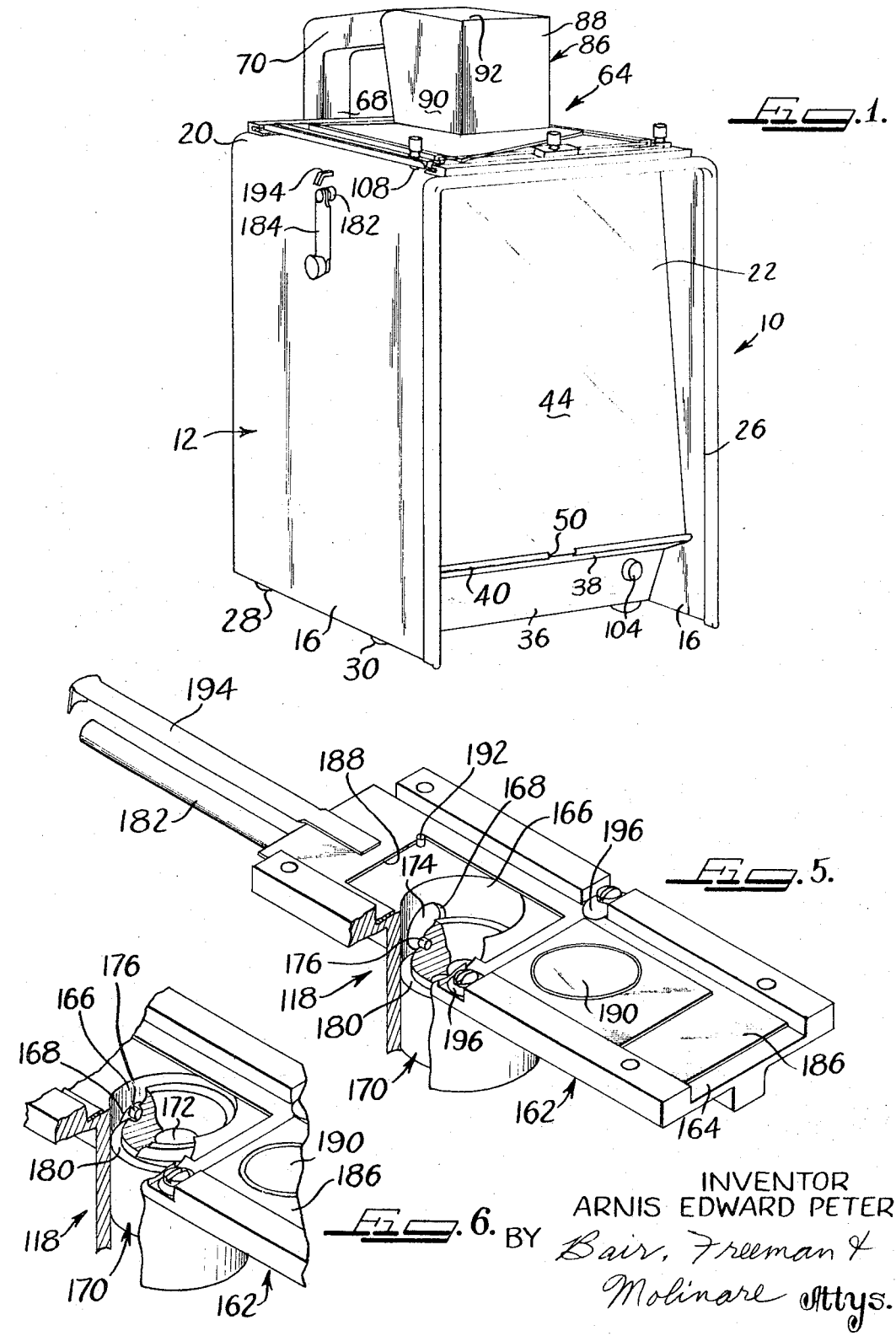
INVENTOR
ARNIS EDWARD PETERS
BY Bair, Freeman & Molinare Attys.

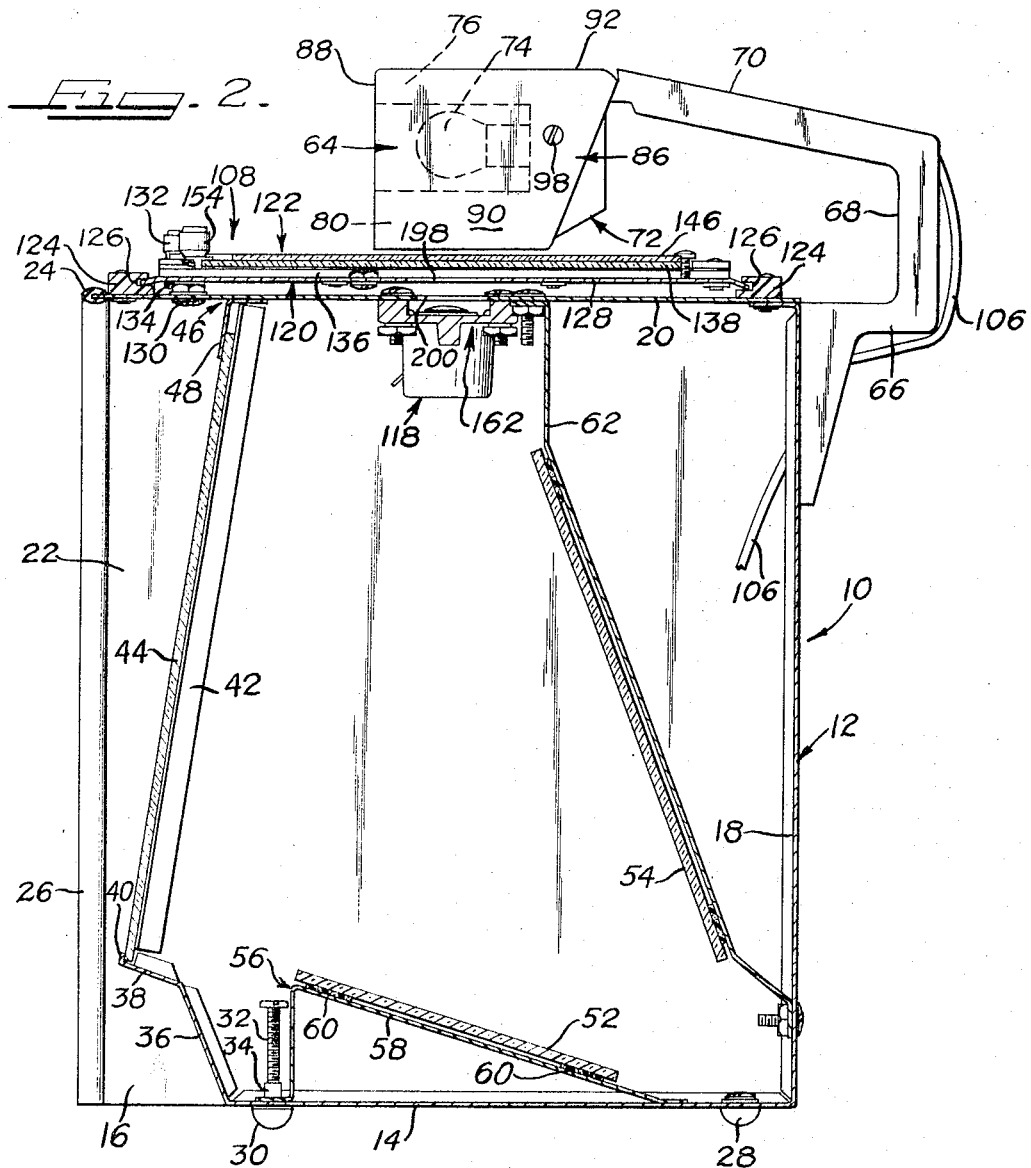

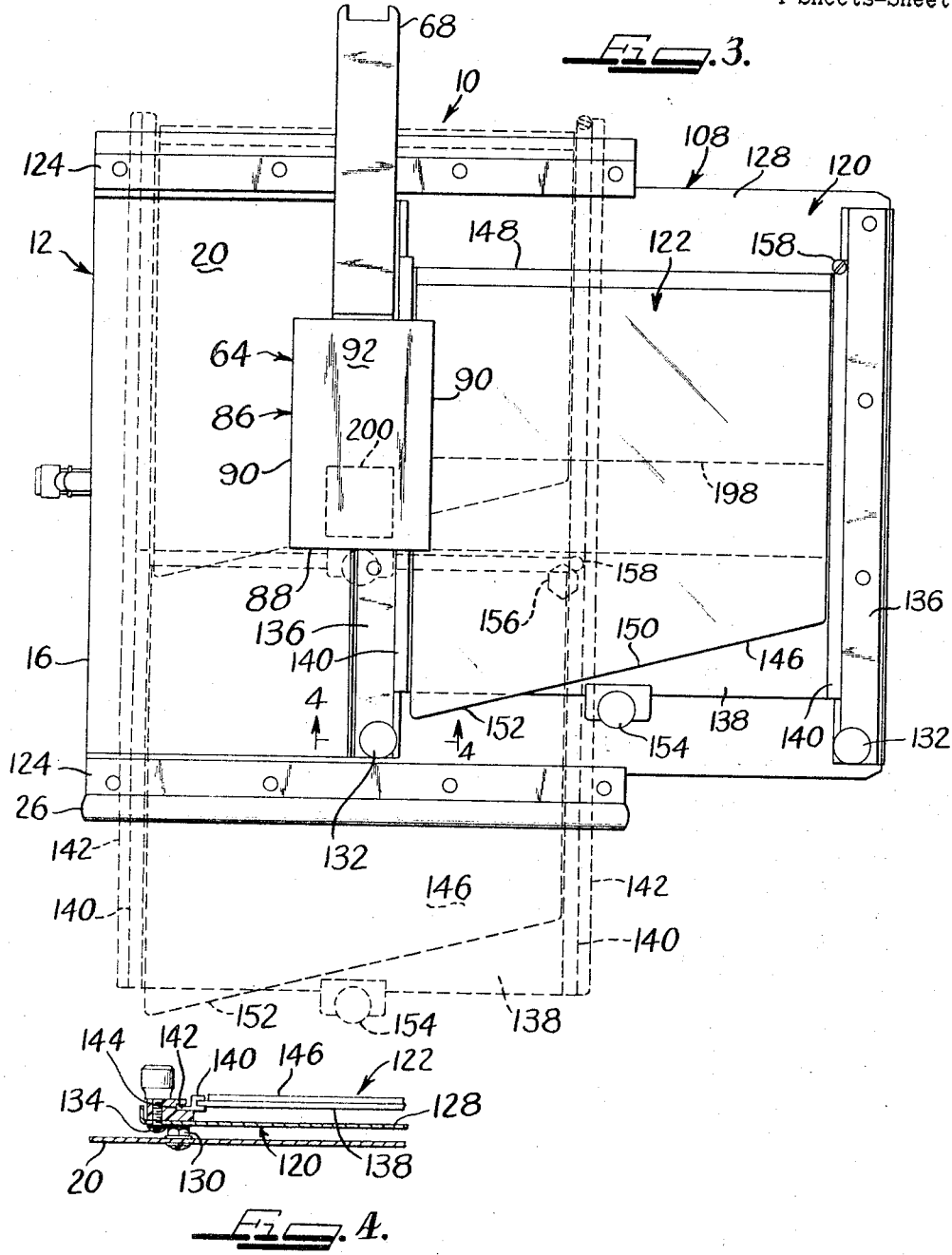

United States Patent Office 3,369,450
Patented Feb. 20, 1968

1

3,369,450
MICROFICHE VIEWER
Arnis Edward Peters, La Crosse, Wis., assignor to The
Microcard Corporation, a corporation of Wisconsin
Filed Sept. 10, 1965, Ser. No. 486,303
6 Claims. (Cl. 88—24)

ABSTRACT OF THE DISCLOSURE

A portable microfiche viewer is provided by a rectangular box-like frame enclosing therein enlarging and projecting means with one side of the box defined by an inclined and recessed translucent viewing screen. The microfiche is supported on a holder and frame positioning means carried on the top side of the box. A source of light is spaced above the microfiche holder and is carried by an arm that is constructed to serve as a carrying handle for the viewer and to accommodate the full range of movement of the holder and frame positioning means. The microfiche holder and positioning means employs two sets of oppositely facing tracks and two separate manual controls for selectively transporting the microfiche in directions perpendicular to each other so as to align selective frames of the fiche with the source of light. Two controls on a side wall of the box permit of selective use of two different magnification lenses and focusing of the projected image.

This invention relates to a new and improved device for reading a microfiche.

Devices for reading information stored on microfilm and on cards carrying microphotographs thereon have been commercially available for years. Microfilm records are normally stored as part of a continuous web on a reel, where each frame on the web constitutes a page of a record. Microphotograph-carrying cards, on the other hand, comprise positive reproductions of many pages of a book or the like, grouped together on a relatively small card that is adapted for storage in a card-file drawer or the like. A "microfiche" is actually a photographic film with multiple microphotographs thereon, in much the same manner as on the microphotograph carrying card. In certain respects, microfiches have advantages over microphotograph-carrying cards, and, accordingly have recently begun to increase in popularity. However, reading machines for scanning microfiches have heretofore been fairly complex and of considerable size, and a really satisfactory portable microfiche reader has not been available commercially.

It is, therefore, an important object of this invention to provide an improved microfiche reader which is compact and lightweight in construction, thereby affording ready portability thereof.

It is a further object of this invention to provide a microfiche reading device which is provided with improved focusing means.

It is another object of this invention to provide a microfiche reader which includes a highly novel holder for the microfiche, providing rapid and easy movement of the microfiche relative to the light source and focusing means so that the individual record pages on the microfiche may be easily and rapidly moved into alignment therewith for viewing.

It is yet another object of this invention to provide a novel microfiche reading device which is substantially maintenance free.

It is still a further important object of this invention to provide a microfiche reader which is characterized by its simplicity and economy of construction, manufacture and operation.

2

Further purposes and objects of this invention will appear as the specification proceeds.

A particular embodiment of the present invention is illustrated in the accompanying drawings wherein:

FIGURE 1 is a perspective view of my novel microfiche reader;

FIGURE 2 is a partially sectioned, transverse view of the device of FIGURE 1;

FIGURE 3 is a top plan view of the reader of FIGURE 2 particularly showing the transporting and holding device for the microfiche;

FIGURE 4 is a sectional view taken along the line 4—4 of FIGURE 3;

FIGURE 5 is a perspective view of the focusing and magnification changing apparatus used in the device of the above figures, while the focusing means is shown in its lowermost position;

FIGURE 6 is a perspective view, similar to FIGURE 5, except that the focusing means is shown in its fully raised position;

Figure 7:
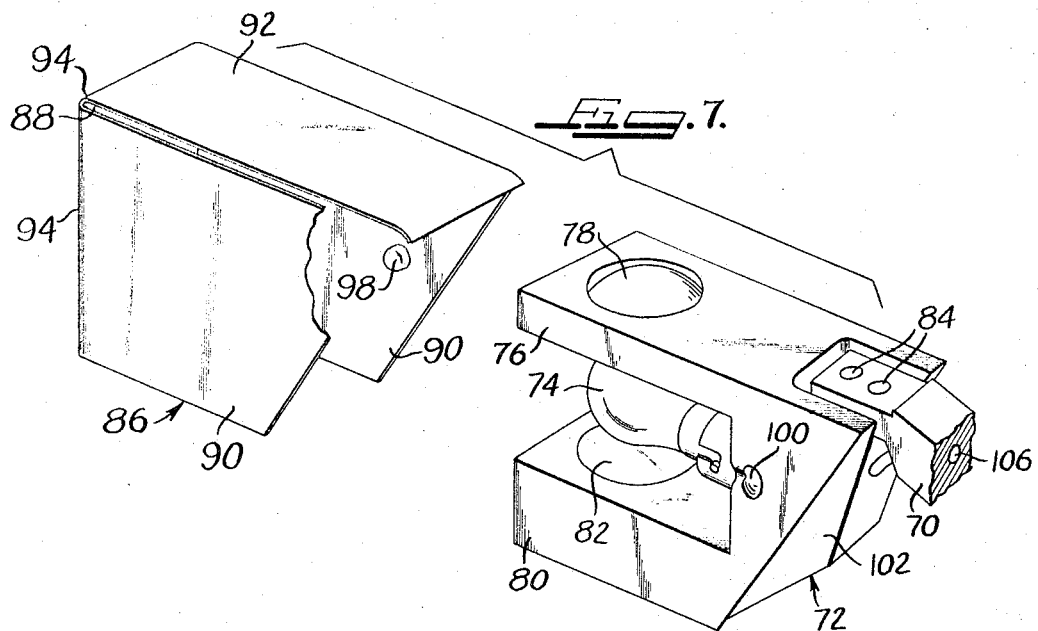
FIGURE 7 is an exploded perspective view of the light source and cover therefor for use with the device of the foregoing figures.

Referring particularly to FIGURES 1 and 2, my novel microfiche reader 10 includes a box-like member or body 12. The member 12 is provided with a bottom or base 14, opposed upright side walls 16, an upright rear wall 18 and a horizontal top or upper wall 20. The front 22 of the box-like member 12 is open and is defined by the forward edges 24 of the side walls 16 and upper wall 20. The open front 22 is of a size which enables an unobstructed view of an enlarged selected portion of a microfiche. The edges 24 are covered by rubber molding 26 so as to provide a finished appearance for the edges 24 while protecting the operator of the reader 10 from injury from the raw edges 24. The reader 10 rests on rearward and forward feet members 28 and 30. The rearward feet 28 are nonadjustably secured to the underside of the base 14 of the box-like member 12. The forward feet 30, on the other hand, are adjustably secured to the underside of the bottom 14 by means of elongated bolts 32 which are threadably received by nuts 34 which are mounted on the inner surface of the bottom 14. By providing vertically adjustable forward feet 30, the front portion 22 of the reader 10 may be tilted upwardly by the operator so as to provide optimum conditions for viewing the image of a microfiche on a screen.

The front or forward portion 36 of the base 14 is bent or turned upwardly forward of the front feet 30 and terminates with an upwardly and outwardly inclined wall 38 having a substantially upright lip 40 defined at its front end. The lip 40 terminates inwardly of the edges 24 of the walls 16 and 20. A pair of L-shaped elongated retainer members 42 are secured or welded along the inner surfaces of the side walls 16 and extend in an upwardly and rearwardly inclined position from an area slightly rearward of the lip 40 to the upper wall 20. The inwardly facing legs of the L-shaped retainers 24, which are substantially parallel with each other, provide support for a translucent viewing screen 44. The screen rests on the inclined wall 38 of the base 14 while the lip 40 prevents undesired outward movement of the screen 44. An elongated retaining strip 46 is secured to the inner surface of the upper wall 20 and passes between the upper ends of the L-shaped retainers 42. The strip 46 has an integral downwardly extending edge 48 which passes in front of the top of the screen 44 and acts to retain the screen 44 in place. The rearwardly inclined viewing screen 44 effectively closes the open front 22 of the box-like member 12 so as to form one of the walls thereof. The screen 44 rests on the wall 38 and is prevented from outward movement by the retaining lip 40 and the downwardly extending edge 48 while the inclined retainers 42 prevent inward or rearward movement thereof. The retainers 42, lip 40, and edge 48 are dimensioned so that they do not interfere with viewing an image on the screen.

The screen 44 is not only tipped rearwardly to facilitate viewing, but it is recessed inwardly from the forward edges 44 which contributes toward the provision of a sharp, clear image on the screen. Preferably the inner, forward surfaces of the upper wall 20 and side walls 16 are darkened so as to further contribute to the clear image on the screen by providing contrast. Referring to FIGURE 1, the front lip 40 is provided with a central cutout portion 50 which permits the operator to lift the screen 44 upwardly (since its height is less than the distance between the lip 40 and the upper wall 20) with a finger so as to move the lower edge of the screen 44 outwardly and away from the lip 40 so that the screen may be removed from the opening 22. When the screen is removed, the viewer may be used as a projector and the image on a mircofiche may be projected on an upright wall or screen.

Located within the box-like member 12 are a lower reflector member or mirror 52 and a second reflector or mirror 54. The lower mirror 52 is mounted on a support 56 secured to the upper, inner surface of the base 14 of the box-like member 12. The support 56 has a raised front portion from which a downwardly and rearwardly inclined wall 58 extends so as to provide a similar downward and rearward incline for the mirror 52. The mirror 52 is mounted on the upper surface of the inclined wall 58 by any suitable fastening or adhesive means 60. The mirror 52 is centrally located at the bottom of the box-like member 12.

The second mirror 54 is mounted within the rear portion of the box-like member 12 and is inclined from the rear lower portion of the member 12 in an upward and outer direction and is adapted to receive the reflection of an image from the first mirror 52 and project or reflect the same to the screen 44. The second mirror 54 is mounted upon a support member 62 which provides the desired forward and upward incline for the mirror 54. The lower and rearward portion of the support 62 is secured to the rear wall 18 while the upper and forward portion of the inclined support 62 is mounted on the upper wall 20. In a manner similar to the fastening of the first mirror 52 to the support 56, the second mirror 54 is secured in any suitable manner to inclined support 62 by fastening means 60.

A light source, generally 64, is mounted over the central portion of the upper wall 20 of the box-like member 12 and directs light vertically downwardly. A lower support arm 66 is mounted away from the open front 22 or screen 44 so as not to obscure viewing and is fixed to the central upper portion of the rear wall 18 and is interconnected by a rear upright portion or bight 68 to an upper substantially horizontal portion or arm 70 which connects to the lamp support member, generally 72. The arms 66 and 70 and bight 68 are constructed and arranged to provide a suitable carrying handle for the reader 10. Thus, the combination serves a dual function of supporting the light source 64 and also providing a carrying handle for the device 10. The upper arm 70 supports the light source at a fixed distance above the aperture 200 in the top 20 of the body 12. The bight 68 is spaced laterally from the walls of the body 12 a distance sufficient to permit alignment of all parts of a microfiche with the aperture 200. The lower arm 66 is connected to the body 12 below the plane of movement of a carrier or transporting holder 108.

Referring more particularly to FIGURE 7, the lamp support member 72 has a frontwardly extending lamp 74 mounted therein. Located axially above the lamp 74 in a forwardly projecting upper ledge 76 is a concave reflector or mirror 78 which provides the necessary light intensity for providing clear images on the screen 44. The lower portion or ledge 80 of the support 72, positioned below the lamp 74, is provided with suitable lens construction 82, such as a pair of condenser lenses spaced apart by a compression spring, and arranged coaxially with the lamp 74, as light from the lamp 74 is cast downwardly. The central portion of the lamp support 72 is of hollow construction and provides for ease of replacement of the lamp 74 from the lamp support 72 when it burns out. This is substantially the only maintenance involved with the reader 10. The lamp support 72 is secured to the forward end of the upper portion 70 of the support arm 66 by a pair of screw or bolt members 84.

When in use, the lamp 74 is enclosed by a cover member 86 which prevents glare when an image is being viewed and is readily mounted and removed from position on the lamp support 72. The cover 86, which is constructed of sheet metal to be springable, includes a front wall 88, opposed side walls 90, and an upper wall 92. The side walls 90 and upper wall 92 are each springably mounted along the top and lateral edges 94 of the cover front wall 88. The side walls 90 are provided with suitable inwardly projecting, rounded members 98, as cap nuts, which engage recesses 100 provided in the rear central portion 102 of the lamp support 72. The outwardly rounded members 98 on the springable side walls 90 of the cover 86 snappably engage the recesses 100 of the central portion 102. The cover 86 is thereby conveniently secured in place while at the same time it is readily removable from engagement with the support 72 to enable replacement of a burnt-out lamp 74.

An on-off switch 104 is mounted on the forward portion 36 of the base 14 for operating the lamp 74. The switch 104 is connected to an electrical supply cord (not shown) and electrical wiring 106 from the switch 104 extends through the interior of the box-like member 12 in such a way as not to interfere with the image from a microfiche, and passes outwardly through the rear wall 18, into the support arm 66 and then is connected to the electric base (not shown) which receives the lamp 74.

Figure 8:
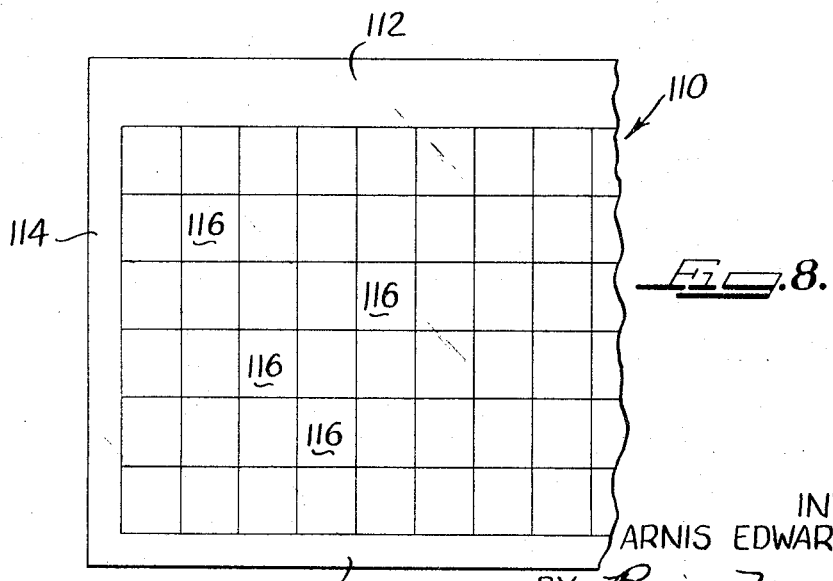
FIGURE 8 is a fragmentary plan view of a microfiche.

One of the important features of the present invention is the provision of a unique holding and transporting apparatus, generally 108, for a microfiche 110. Referring to FIGURE 8, a typical microfiche 110 includes an identification border 112 and side and bottom borders 114. Each of the squares or frames 116 shown in FIGURE 8 represents a page of a letter, book, record, or the like. These squares 116, which contain images, are positioned in close proximity so that a multiplicity of page records may be included on a single microfiche 110. For viewing of a microfiche, there is relative movement between light source and aligned focusing means so that the relative location of the microfiche is changed for viewing the various pages on the microfiche. In order to provide the desired transportability for the microfiche 110, the transporting and holding apparatus or carrier 108, which is substantially parallel to the top 20 of the box-like member 12, moves the microfiche 110 relative to the light source 64 and focusing means 118 by movably interposing the microfiche 110 therebetween.

Referring particularly to FIGURES 2, 3 and 4, the carrier 108, which is maintained at a fixed distance above the top 20, is provided with a first slidable member 120, which is slidable in a transverse direction relative to the viewing screen 44, and a second slidable member 122, which is slidable in a longitudinal direction relative to the screen 44. A first set of guide member or tracks 124 are secured along the forward and rearward edges of the upper wall 20 of the box-like member 12. Each of the tracks is provided with inwardly facing grooves 126 for receiving the forward and rearward edges of a metal sliding plate 128 of the first slidable member 120. Preferably, the track members 124 are constructed of nylon, while the plate 128 is constructed of a suitable lightweight metal, such as aluminum in order to provide smooth parts for smooth sliding when the plate is pushed. At the same time the friction is sufficient to avoid relative movement between the tracks 124 and the plate 128 during viewing of an image on the screen, even, for example, when the device is tipped to one side or the other.

In order to prevent sidewise or lateral overtravel of the first slidable member 120, suitable stop means are desirably provided. Advantageously a fixed stop 130, as an upwardly projecting screw or nut element, is secured to and projects upwardly from the upper wall 20 while it is spaced sufficiently below the sliding plate 128 so that there is free movement of the metal plate 128 thereover. The forward corners of the first slidable member 120 are provided with upright handles or knobs 132 for facilitating the manual sidewise movement of the slidable member 120 by an operator. The handles 132 are secured to the plate 128 by screw heads which project downwardly through the metal plate 128. The downwardly projecting screw heads 134 are in alignment with the fixed upwardly projecting stop element 130 and interfere therewith so as to cooperate with the stop element 130 for a avoiding transverse or lateral overtravel of the sidewardly moving member 120 of the microfiche transporting apparatus 108.

The second slidable member 122 is slidable in a longitudinal direction on the first slidable member 120, which includes track members or guides 136 along its lateral edges for providing the desired sliding of the second slidable member. The second slidable member 122 which functions as a microfiche holder, includes a flat transparent or glass member 138 having elongated edge members, constructed of metal, secured to the lateral edges of the transparent member 138. The elongated members 140 have outwardly extending edges 142 which are slidably received in the inwardly facing grooves 144 of the tracks 136. The rear edge of the lower transparent member 138 has a second transparent or glass member 146 hingedly connected thereto. The second transparent member is moved into substantially flush contact with the upper surface of the first transparent member 138 for trapping a microfiche 110 therebetween. A hinge element is provided by a metallic foil strip 148 which is adhesively secured to the lower rear edge of the first transparent member 138 and to the upper rear edge of the upper transparent member 146. The first and second members 138 and 146 thereby cooperate to provide a holder for a microfiche 110 which maintain the microfiche 110 in a substantially flat and protected condition during viewing.

The hinged flat transparent member 146 has an outwardly tapered forward edge 150 defining a corner 152 which projects outwardly from the forward edge of the lower transparent member 138 so as to provide a finger tab to facilitate the raising of the upper hinged transparent member 146 away from the first glass member 138. A knob or handle portion is secured to the forward central portion of the lower glass member 138 to facilitate the sliding movement of the microfiche 110 in a transverse direction. The knob 154 also acts as a stop element in cooperation with the front wall 88 of the lamp cover 86 to prevent overtravel of the second slidable member 122 in a rearward direction. In order to prevent overtravel of the slidable member 122 in a forward direction, an upwardly projecting stop element 156 is mounted on the metallic plate 128 of the first slidable member 120 at a point adjacent one of the track members 136. Cooperating with this stop element 156 to prevent forward overtravel is a downwardly projecting element 158 located at the rear corner of the first glass member 138. The downwardly projecting element 158 is aligned to interfere or abut with the upright stop element 156 so as to prevent overtravel of the slidable member 122 in a forward direction.

Another important feature of my device 10 is the focusing and magnification changing apparatus, generally 118, which is shown most clearly in FIGURES 5 and 6. The apparatus includes an elongated support member 162 which is secured in a transverse position to the underside of the upper wall 20 of the box-like member 12. The elongated support 162 includes a longitudinal central recessed portion 164. The support also has an upright bore or aperture 166 which intersects with the central portion 164 and a transverse, sidewardly opening aperture 168 which intersects with the upright bore 166. The axis of the transverse aperture 168 is at right angles with the axis of the upright bore 166 and is longitudinal of the central recess 164.

A lens holder 170 is slidably mounted within the bore 166 so that the lens means 172 contained therein is moved in an up and down direction so as to adjust the focusing of a microfiche image on the screen 144. In order to accomplish this up and down sliding movement, a cylindrical member 174 is rotatably carried within the transverse aperture 168. An eccentrically located pin 176 projects outwardly from the outer face of the rotatable member 174. The pin 176 engages a circumferential groove 180 defined in the cylindrical outer wall of the lens holder 170. The outer end of the rotatable member 174 is fixed to an arm 182 which projects outwardly from the rotating member 174 and through one side wall of the box-like member 12, as best seen in FIGURE 1. A crank 184 is positioned at the outer end of the arm 182 so as to facilitate the rotation of the rotatable member 174 and thereby effect reciprocal movement in a vertical direction of the lens holder 170 and thereby the lens 172 due to the interengagement between the eccentrically mounted pin 176 and the groove 180. Proper focusing for an image on the screen 44 is provided as the lens 172 is moved in an upward and downward direction.

Of further importance, the magnification provided by our focusing device 108 may be changed. Specifically, a slidable plate 186 is slidably mounted within the longitudinal central recess 164 of the support member 162. The slidable plate 186 is provided with a rectangular aperture 188 which, in one position, is aligned directly above the bore 166 so that there is no lens interposed between the sliding lens 172 and the microfiche 110 contained within the holder. When the operator desires to change or increase the magnification of the image being viewed on the screen 44, the plate 186 is slidably moved laterally so that a lens 190 mounted on the slidable plate 186 is moved into direct alignment with the lens 172 and microfiche 110, while interposed therebetween. A fixed upwardly projecting stop pin 192 is mounted on the central recess 164 and extends into the rectangular aperture 188 in the slidable plate 186. In one extreme lateral position, the pin 192 cooperates with one end of the aperture 188 to locate the aperture 188 directly above the bore 166 and lens 172. In the opposite extreme position, the pin 192 cooperates with the other end of the aperture 188 to coaxially locate the lens 190 relative to the lens 172 and the bore 166.

An arm 194 is secured to one end of the slidable plate 186 and extends outwardly therefrom through the same side wall as the rotatable arm 182 and is substantially parallel with the rotating arm 182. The controls for both the magnification and focusing of the image on the screen 44 are thus located conveniently adjacent each other so as to provide for ease of operation. The slidable plate 186 is maintained in sliding engagement with the central portion 164 by means of downwardly turned leaf springs 196 which engage the upper lateral edges of the plate 186 for permitting sliding movement thereof in the recess 164. The leaf springs 196 are secured to the support member 162 in a suitable manner, as by means of screws.

Although it is believed that from the foregoing detailed description of my microfiche reader 10, the manner of using the device is clear, a brief detailed description of the method of operation will be provided so that the simplicity of operation will be more apparent.

The device 10 is first plugged into a suitable electrical outlet and the switch 104 on the front of the device 10 is turned to the "on" position. This turns on the lamp 74 which, by cooperation of the concave mirror 78, casts an intense light downwardly through the condenser lens means 82. The light also passes through a transversely elongated rectangular aperture 198 in the metallic plate 128 of the first slidable member 120 and through a small square aperture 200 in the central portion of the upper wall 20 of the box-like support member 12. A microfiche 110 is inserted between the flat glass members 138 and 146. This is accomplished by pulling the knob 154 and thereby the second slidable member to the full forward position so that the upper glass member 146 may be pivoted upwardly free of the overhead light source 64. The lift tab 152 of the upper glass 146 is then pivoted upwardly to a substantially vertical position. The microfiche 110 is then placed in the appropriate position on the lower glass member 138. The upper glass flat is then placed down on to the microfiche 110 which is then maintained in a flat, protected condition between the upper and lower glass members 138 and 146. An image square 116 of the microfiche is then placed beneath the light from the lamp 74 so that light is cast through the square containing an image and through the focusing lens 172. After passing through the lens 172, the light and the microfiche image are cast upon the first lower mirror 52 which reflects the image and light to the second upright mirror 54, which in turn casts the image and light to the screen 44 for viewing the image.

At this time, it is usually necessary to properly focus the image and this is accomplished by rotating the arm 182 by means of the crank 184. This rotation rotates the rotatable member 174 which moves the eccentrically mounted pin 176 within the circumferential groove 180 in the lens holder 170. The lens 172 is thus caused to be moved between the lowermost position, as shown in FIGURE 5, to the uppermost position, as shown in FIGURE 6. After the image is properly focused on the screen, the operator moves the slidable members 120 and 122 to the desired position for viewing the particular page contained on the microfiche. This positioning of the microfiche relative to the light source and focusing means is accomplished both by transverse and by longitudinal movements of the first and second slidable members 120 and 122.

If the operator of the reader desired to see an image in greater magnification, referring to FIGURE 5, the arm 194 is pulled in a direction outwardly away from the support 162 to thereby move the movable lens 190 into axial alignment with the mirror 78, with the lamp 74, with the glass 82, and with the reciprocal focusing lens 172.

It is also noteworthy that if the operator desires to use the device as a projector, the removable screen 44 may be lifted upwardly away from the lip 40 by finger contact through the cut-out portion 50 in the lip 40. The light cast from the second reflector 54 thereby casts upon a vertical wall or screen for viewing the image of a microfiche. From the foregoing, it is apparent that my improved microfiche reading device 10 is highly simple in its operation and use while providing for very reliable operation which is substantially maintenance free.

While in the foregoing there has been provided a detailed description of a particular embodiment of the present invention, it is to be understood that all equivalents obvious to those having skill in the art are to be included within the scope of the invention as claimed.

What I claim and desire to secure by Letters Patent is:

1. A portable microfiche viewer comprising, in combination, a substantially rectangular box having a flat top with an aperture centrally located in said top, an inclined viewing screen substantially occupying one upright side of the box and serving as the front of the viewer, front and rear tracks secured to the top of said box substantially along the front and rear edges thereof, a plate having opposed edges slidable in said front and rear tracks, an elongated aperture in said plate parallel to the directions of sliding movement of the plate and in register with the top aperture in said viewer, a second pair of spaced tracks on the upper side of said plate extending transversely to the front and rear tracks, a microfiche holder spaced above said plate and having lower and upper transparent portions, means arranging the microfiche holder for sliding movement in the second pair of tracks, two separate means attached respectively to the plate and microfiche holder for selective manipulation of each in opposite directions along the two different pairs of tracks, and a source of light spaced above the microfiche holder and in register with the top aperture of the viewer.

2. An improved holding and transporting apparatus for aligning a selected frame of a multi-frame microphotograph with the image projecting aperture in a wall of a framed viewer of the type that encloses an image-reflecting-and-enlarging means and where a side of the viewer is a viewing screen, said holding and transporting apparatus comprising, in combination, a first pair of spaced, elongated tracks secured to the apertured wall of the viewer on opposite sides of said aperture, a plate having opposed edges slidable in opposite directions in said first pair of tracks, a second pair of spaced parallel tracks carried on said plate and of a length less than the spacing of said first pair of tracks, the second pair of tracks extending in directions perpendicular to the first pair of tracks, a flat support member having a transparent portion against which the microphotograph is to be held, said support member being spaced from said plate and having opposed edges slidable in opposite directions in said second pair of tracks, said plate having an elongated aperture parallel to said first pair of tracks and positioned in register with the aperture in the viewer, a first control means on said plate facilitating manual movement of the plate and the support member carried thereon along said first pair of tracks, a second control means separate from said first control means, carried on the support member and for facilitating manual movement of the support member along the second pair of tracks, so that selective manipulation of the first and second control means will be operable to selectively align all sections of the transparent portion of the support member with the aperture in the viewer, a first means on said plate and viewer to prevent overtravel of the plate in said first pair of tracks, and a second means including an element carried on said support member for preventing overtravel of the support member in said second pair of tracks.

3. A device as in claim 1 including an elongated arm supporting the source of light and extending above the path of travel of the microfiche holder to a point spaced rearwardly of the rear wall of the viewer and then turning downwardly and connecting to the rectangular box below the top thereof, thereby providing for full-range movement of the microfiche holder relative to the top aperture of the viewer without any interference between the holder and the support for the light source.

4. A device as in claim 1 including first stop means including elements on the top of the viewer and downwardly extending elements on the plate cooperating to prevent overtravel of the plate in both directions along the front and rear tracks, and second stop means including elements on the microfiche holder and on the viewer cooperating to prevent overtravel of the holder in both directions along the second pair of tracks.

5. A device as in claim 2 wherein the flat support member has a second transparent member hinged thereto and adapted to move into substantially flush contact with the transparent portion of the support member, said hinged connection including a metallic foil strip adhesively secured to the edges of the support member and second transparent member to avoid any interference with said flush contact between adjacent sides of said members.

6. A device as in claim 1 wherein the microfiche holder includes two flat glass members hinged together at one edge, said hinged connection including a flexible strip secured to the adjacent edges of the two glass members so as to insure obtaining flush contact between the flat glass members when the microfiche holder is closed.

References Cited

UNITED STATES PATENTS

| | | | |
|---|---|---|---|
| 2,369,248 | 2/1945 | Pratt | 88—24 |
| 2,377,476 | 6/1945 | Berglund | 88—24 |
| 2,404,189 | 7/1946 | Place | 88—24 |
| 2,473,736 | 6/1949 | Stern | 88—24 |
| 2,782,680 | 2/1957 | Howell | 88—24 |
| 3,175,461 | 3/1965 | Brownscombe | 88—24 |
| 3,224,326 | 12/1965 | Brownscombe | 88—24 |

NORTON ANSHER, *Primary Examiner.*

R. M. SHEER, *Assistant Examiner.*